US009456251B2

(12) United States Patent
Vadura et al.

(10) Patent No.: US 9,456,251 B2
(45) Date of Patent: Sep. 27, 2016

(54) HUB TV DISTRIBUTED SYSTEM

(71) Applicants: Dennis Vadura, Trabuco Canyon, CA (US); Wei Kang Tsai, Irvine, CA (US); Timothy Hayden Nelson, Orange, CA (US)

(72) Inventors: Dennis Vadura, Trabuco Canyon, CA (US); Wei Kang Tsai, Irvine, CA (US); Timothy Hayden Nelson, Orange, CA (US)

(73) Assignee: Badu Networks, Inc., Irvine, CA (US)

( * ) Notice: Subject to any disclaimer, the term of this patent is extended or adjusted under 35 U.S.C. 154(b) by 0 days.

(21) Appl. No.: 14/608,710

(22) Filed: Jan. 29, 2015

(65) Prior Publication Data

US 2016/0227286 A1  Aug. 4, 2016

(51) Int. Cl.
*H04N 7/173* (2011.01)
*H04N 21/478* (2011.01)
*H04N 21/472* (2011.01)

(52) U.S. Cl.
CPC .. *H04N 21/47815* (2013.01); *H04N 21/47202* (2013.01)

(58) Field of Classification Search
CPC ............. H04N 21/21; H04N 21/2225; H04N 21/23109; H04N 21/2347; H04N 21/2396; H04N 21/2542; H04N 21/2543
USPC .............. 725/1, 87, 93, 104, 115, 116
See application file for complete search history.

(56) References Cited

U.S. PATENT DOCUMENTS

| | | | |
|---|---|---|---|
| 2001/0049824 A1* | 12/2001 | Baker | G06Q 30/02 725/109 |
| 2008/0155614 A1* | 6/2008 | Cooper | G06F 21/10 725/91 |

\* cited by examiner

*Primary Examiner* — Dominic D Saltarelli

(57) ABSTRACT

A method and system, called Hub-TV system, allows a mass of consumers who individually owns a private infrastructure to share the burden of storing, searching, authentication, and delivery of digital media items, for the purpose of selling and distributing digital items over the Internet. The consumer may have previously purchased a media item and is compensated for contributing to redistribute the media item through his private infrastructure, which comprises server resources, storage resources, and bandwidth resources. A platform provider of a Hub-TV system provides the control and management functions to ensure that a plurality of broker agents, a plurality of delivery agents, a plurality of payment agents, and a mass of consumer-distributors, are compensated for their services in the Hub-TV system.

A consumer who purchases a media item through a Hub-TV system may have to receive a play token, and optionally a decryption key to consume the purchased item.

6 Claims, 3 Drawing Sheets

HUB TV DISTRIBUTED SYSTEM

CROSS REFERENCES TO RELATED APPLICATIONS

The present application claims priority to U.S. Provisional Patent Application No. 61/933,298 filed on Jan. 29, 2014, which is hereby incorporated by reference in its entirety.

FIELD OF THE INVENTION

The present invention relates in general, to methods and systems for distributing copy-righted digital content over the Internet, and in particular, to methods and systems that allow sellers of copy-righted digital media such as animations, sound recordings, video recordings, simulations, electronic books (e-books), computer software, electronic publications (e-publications), etc., to market and sell their content through distributors to consumers over the Internet.

BACKGROUND OF THE INVENTION

Today, all types of copyrighted digital media or content are marketed and sold through the Internet. The varieties of digital media have become so large and complex that it is now impossible to classify them properly. In this specification, videos are used as an exemplary media type for the purpose of applying the present invention. However, this does not imply in any way that the present invention is applicable only to this form of digital media. The use of videos is only for presentation simplicity and a vehicle for exemplary embodiments.

Presently, copyrighted videos such as TV shows, movies, and video clips of all types, are distributed through large corporations. For small producers, the primary channel for distributing their productions is through YouTube. But YouTube is not the best way to maximize economic returns. YouTube limits the producer with 2 options: earning income through advertisement or through subscription fees. In either case, since YouTube controls the distribution channel, the producer's share of income is always at the mercy of YouTube.

An alternate channel is selling through an IPTV (Internet-Protocol TV) provider such as Amazon Instant Video or Hulu, as a pay-per-view video, or a part of a paid-subscription programming, which is similar to Cable TV bundling.

On the other hand, video consumers are restricted in their programming choice. For example, cable-TV operators offer a bundled programming (scheduling) of TV shows, which the customer has only a limited ability to customize. As a result, most cable consumers pay for the shows that they don't want in order that they can watch the shows that they want.

Therefore, both video producers and consumers are facing limited options—as a result, producers or sellers pay a high cost of distribution with limited options, while the consumers also pay a high cost of viewing with limited options.

The reason for this disparity is the high cost of video delivery infrastructure. Under the present business arrangements, the middlemen or the video distributors must own a delivery infrastructure to stream videos directly from the infrastructure to the consumer. This delivery arrangement is adopted not because it is cheaper, but because it protects the copyright of the video owners. The TV/movie industry has, from the dawn of their industry, an overwhelming concern for copyright protection.

Under the current scheme, videos are streamed chunk-by-chunk to the consumer. Further, the downloaded videos are not repeatedly playable even if they are stored. This scheme protects the copyright tightly, but at a higher cost to both producers (or sellers) and consumers.

However, the concern for copyright protection should be balanced against the efficiency of earning economic returns. The current system gives the concern for copyright protection an inordinate weight over the concern for economic returns.

From the infrastructure point of view, there is no particular reason for preferring a large-scale centralized infrastructure for video delivery as it is today. As the Internet is inherently distributed, it is possible to deliver videos completely through a distributed infrastructure that is owned by a mass of people.

Therefore, there is a need for new methods and systems to improve the economic efficiency of distributing videos over the Internet. In a similar fashion, there is also a need for new methods and systems to improve the economic efficiency of distributing non-video media items over the Internet. The new methods and systems should provide a lower cost for both distribution and consumption, with a wider spectrum of choice for both sellers and consumers. The new methods and systems should provide an adequate protection of copyrights, while raising the economic efficiency for both sellers and consumers.

BRIEF SUMMARY OF THE INVENTION

It is therefore an object of the present invention to provide a method and system, called Hub-TV system, which reduces or mitigates one or more of the disadvantages described above.

One aspect of the present invention is broadly defined as a method of distributing and reselling digital media items through an infrastructure owned by a mass of consumers-distributors, each of whom allows a Hub-TV system to store, search, authenticate, and deliver a copy of a media item to a consumer through his private infrastructure. Such a consumer-distributor may or may not own a copy of the digital media that is delivered to a consumer. In this way, both the owner and the consumer-distributor of the media item earn an economic return.

Another aspect of the present invention provides a method for building an infrastructure for a Hub-TV system that includes the aggregate of server resources, storage resources, and bandwidth resources, to work together to offer a distributed mechanism to sell and distribute digital media items. One or more platform providers, a plurality of broker agents, a plurality of delivery agents, a plurality of payment agents, and a mass of consumer-distributors variously own these resources.

Another aspect of the present invention allows a platform provider of a Hub-TV system to act as an operator to offer services to store, search, authenticate, retrieve, and deliver digital media items to the storefronts associated with the Hub-TV system. The services of a platform provider may also include an electronic payment system to deliver economic returns to a broker agent, a delivery agent, a consumer-distributor, or a payment agent.

Another aspect of the present invention is a method that utilizes at least one of 3 mechanisms to protect copyrights of digital media items sold through a Hub-TV system. In the first mechanism, a media consumer uses a Hub-TV media player (software installed in a hardware device) that requires a play token. In the second mechanism, a media item sold through a Hub-TV system is encrypted with a Hub-TV media encryption scheme. In the third mechanism, a Hub-TV encrypted media item is stored, searched, authenticated, and delivered via the infrastructure of a Hub-TV system.

Another aspect of the present invention is a method that allows a platform provider, a consumer-distributor, a broker agent, a payment agent, or a delivery agent, all of which have contributed to consummating a transaction to sell a media item through a Hub-TV system, to receive a compensation.

In accordance with one aspect of the present invention, when the media type is video, the Hub-TV system resembles a communal Netflix. In accordance with another aspect of the present invention, the Hub-TV system resembles a paid BitTorrent system.

This Summary is provided to introduce a selection of concepts in a simplified form. The concepts are further described in the Detailed Description section. Elements or steps other than those described in this Summary are possible. The claimed subject matter is not limited to the implementations that solve any or all disadvantages noted in any part of this disclosure.

BRIEF DESCRIPTION OF THE DRAWINGS

The above and other objects and features in accordance with the present invention will become apparent from the following descriptions of embodiments in conjunction with the accompanying drawings, and in which.

DETAILED DESCRIPTION OF EXEMPLARY EMBODIMENTS

Figure 1:
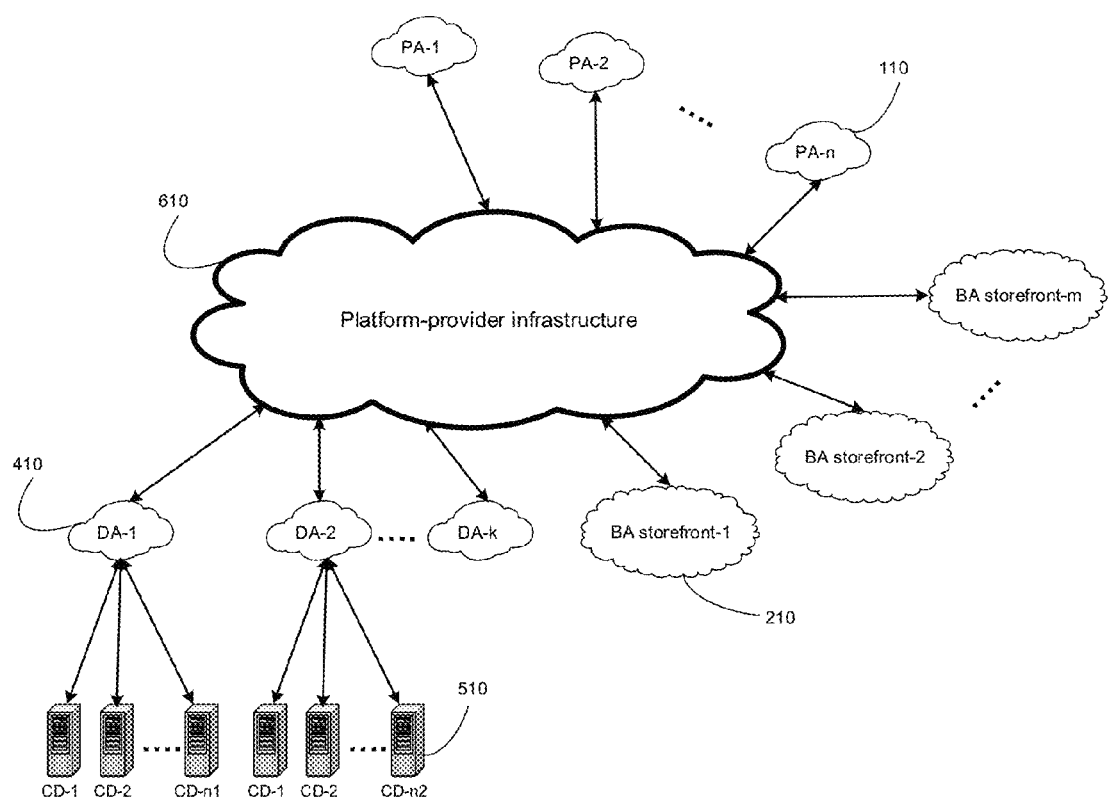
FIG. 1 is a connection diagram illustrating how the various infrastructures owned by a plurality of entities are connected in a Hub-TV system.

A method and system, called Hub-TV system, allows one or more platform providers (PPs), together with a plurality of broker agents (BAs), a plurality of payment agents (PAs), a plurality of delivery agents (DAs), and a plurality of consumer-distributors (CDs), to offer a mechanism to redistribute digital media items from sellers directly or indirectly to consumers over the Internet, with low costs and flexible choices.

In a Hub-TV system, a CD owns a private infrastructure comprising storage resources, server resources, and bandwidth resources—each CD pays for his resources (hardware, software, and services), and the bandwidth to the Internet. When needed, a CD allows his private infrastructure to be employed for storing, searching, authentication, and delivery of media items sold through a Hub-TV system. The private infrastructure of a CD, which is employed for a Hub-TV system, is referred to as the CD's Hub.

The reason for the name "Customer-Distributor" is that a CD may be both a consumer and a distributor at the same time. A key concept of a Hub-TV system is that a media consumer, with an authenticated copy of a media item stored in his own private infrastructure, is allowed to redistribute the same media item for earning an economic return. Such a consumer may have previously purchased an authenticated copy of the media item for consumption. However, in a Hub-TV system, it is not required for a CD to be a consumer. A CD may simply be a private entity that allows a Hub-TV system to store, search, authenticate, and deliver a media item through his Hub.

A first benefit to a media seller or owner is that a Hub-TV system expands the channel to sell or distribute his media items. A second benefit is that the cost of delivering his media items to his customers is lowered through the sharing mechanism of a Hub-TV system—the CDs share their private Hubs for the purposes of the Hub-TV system.

The infrastructure of a Hub-TV system is divided into 4 parts. The first part, referred to as the control infrastructure, comprises the infrastructures of one or more PPs. The second part, referred to as the delivery infrastructure, comprises the infrastructures of the DAs and CDs. The third part, referred to as the sales infrastructure, comprises the infrastructures of the BAs and their web storefronts. The forth part, referred to as the payment infrastructure, comprises the infrastructures of the PAs.

The infrastructure of a PP, a BA, a PA, or a CD, may comprise server resources, storage resources, and bandwidth resources. These resources are embodied in software, hardware, or services purchased from another party.

An object of a platform provider (PP) of a Hub-TV system is to provide the control and management functions to ensure that the entire Hub-TV system operates as a coherent system. A PP of a Hub-TV system acts as an operator that provides a set of services to the BAs, PAs, DAs, and CDs, each of which works with the Hub-TV system. These services may include storing, searching, authentication, and delivery of the media items sold through the Hub-TV system.

Another object of a platform provider of a Hub-TV system is to provide some or all of the software needed for the operations of the Hub-TV system. The software may be installed in the infrastructures of the BAs, PAs, DAs, CDs, or even ordinary consumers.

In particular, it may be required to install special media player software in order to allow a consumer to consume a media item, which is of special media types and sold through a Hub-TV system. The special player software for a specific media type for a Hub-TV system is developed by a PP of the Hub-TV system.

In a Hub-TV system, the PPs, BAs, PAs, DAs, and CDs are owned by possibly different entities. However, a PP of a Hub-TV stem may own additional infrastructures to act as a BA, a DA, a PA, or a CD.

In a Hub-TV system, a PP ensures the quality of the services provided by the PP through the infrastructure of the Hub-TV system. A BA, a PA, a DA, or a CD of a Hub-TV system maintains an account with a PP of the Hub-TV system. An object of a PP is to maintain interoperability of different infrastructure pieces, for the purpose of storing, searching, authentication, and delivering the media items sold through the Hub-TV system.

A key to a Hub-TV system is a proper balance between copyright protection and earning economic returns. In a Hub-TV system, copyright protection is embodied in 3 mechanisms.

In the first mechanism, for selected types of media, a media consumer uses a Hub-TV media player (software installed in a hardware device) that requires a play token, which is specifically generated for each copy of a media item sold through the Hub-TV system. In case the media item is a video or audio clip, the player is a device that plays a video or audio clip. In case the media item is an e-book, the player is a device for viewing the content of an e-book. Thus, the player is a media dependent device to allow a user to consume a media item of specific types. A media seller, a payment agent, a broker agent, a platform provider, or a combination thereof, may issue a play token.

A play token may be embodied in the form of a registration key, a decryption key, a password, an electronic receipt, or any digital object that enables a consumer to consume or utilize a media item.

In the second mechanism, for selected types of media, media items sold through a Hub-TV system may be encrypted with a Hub-TV media encryption scheme. The encryption scheme for a media type may depend on a specific PP of the Hub-TV system.

In the third mechanism, a Hub-TV encrypted media item is searched and delivered via the Hub-TV infrastructure. Upon receiving a distribution token for a media item, a DA searches and determines a best available copy of the media item stored in the infrastructure of the Hub-TV system. The DA then issues one or more delivery tokens for the media item and forwards the delivery tokes to one or more CDs selected for delivering the media item to the intended consumer.

In accordance with one aspect of the present invention, an entity such as a PP, a PA, a BA, a DA, or a CD, receives a compensation for allowing a Hub-TV system to use its infrastructure. The compensation can be in the form of real money, virtual money, or store credit in an online or brick-and-mortar store.

An object of a BA (broker agent) of a Hub-TV system is to act as a middleman between media sellers and their potential and actual customers through a storefront associated with the Hub-TV system. In accordance with one aspect of the present invention, a BA provides a web storefront for a plurality of media sellers. The storefront may include services such as marketing, search engines, online catalogues, and consumer reviews. The storefront may also provide an online purchase service, which may be linked to a number of PAs (payment agents).

In an online purchase through a Hub-TV associated storefront, the transaction becomes pending once the buyer enters the data for his payment method and confirms the purchase. A PA is then contacted for payment approval.

When the payment for a purchase is approved and the approval is relayed back to the storefront, a BA or PA may generate one or more distribution tokens for the selected-for-purchase media item and sends the distribution tokens to one or more DAs. A distribution token for a media item allows a DA to select the best CDs to deliver the media item.

Alternately, a BA or PA may generate a broker token and sends the broker token to a PP. Upon receiving a broker token for a media item, a PP of a Hub-TV system searches and selects one or more DAs for the media item. The PP issues and sends distribution tokens for the media item to the selected DAs.

An object of a PA (payment agent) is to provide an interface between an electronic payment system and an online purchase service. An electronic payment system may or may not require a payment card. A payment system can be a transaction-acquiring financial institution or processor, or any other financial institution that approves and executes electronic payment.

Once a transaction is consummated through a Hub-TV system—i.e., the media item has been delivered, and the intended consumer has received a play token (when needed) and a decryption key (when needed) to consume the purchased item—a PA or a PP ensures that due compensation is delivered to the media seller. In addition, a PA or a PP may also ensure that due compensations are delivered to the CDs that have contributed to delivering the media item, to the BA that has provided the storefront to consummate the Hub-TV based transaction, to the DAs that have participated in delivering the purchased media item, or to a PP of the Hub-TV system.

An object of a DA (delivery agent) is searching and determining the best available CDs with authenticated copies of a media item, which are available for delivering the media item. Upon receiving a distribution token for a media item, a DA searches and selects the best CDs for delivering the media item. The DA may also be informed of the address to deliver the media item to the intended consumer.

A second object of a DA is to generate a URL (uniform resource locator) for the intended consumer to download the media item. Upon receiving a distribution token, a DA issues and sends delivery tokens for a media item to CDs selected for delivering the media item. Upon receiving a delivery token for a media item, a CD sets up its Hub so that the intended consumer can download the media item through his Hub. After a mechanism to deliver a media item to an intended consumer is ready to run, the DA generates a URL to allow the consumer to download the media item.

In a Hub-TV system, the seller of a media item, or a broker agent, or a PP issues a play token. A play token for a media item represents a permit for a consumer to consume said media item. A play token may also contain a decryption key to decrypt a Hub-TV encrypted media item. The play token can be of 2 types: the first type allows one-time consumption of a media item, and the second type allows unlimited or a large number of repeated consumptions of the same media item.

One PP of a Hub-TV system owns the control over generation, modification, and destruction of all broker tokens, all distribution tokens, and all delivery tokens, which are deployed in the Hub-TV system. One PP of a Hub-TC system owns the control over the media encryption schemes deployed in the Hub-TV system.

One PP of a Hub-TV system owns the control over generation and modification of all the play tokens, all the encryption keys, and all the decryption keys, which are deployed in the Hub-TV system.

FIG. 1 shows a connection diagram illustrating how the infrastructure pieces owned by a PP of a Hub-TV system, and the various BAs, PAs, DAs and CDs, are connected. In this embodiment, there are k DAs, and each DA infrastructure 410 is directly connected to the PP infrastructure 610. A typical DA, such as DA-1, is directly connected to a group of CDs. In this illustration, there are n1 CDs that are directly connected to the infrastructure of DA-1; there are n2 CDs that are directly connected to the infrastructure of DA-2. In this diagram, there are m broker-agent storefronts 210 and n payment agents 110, which are directly connected to the PP infrastructure 610.

Figure 2:
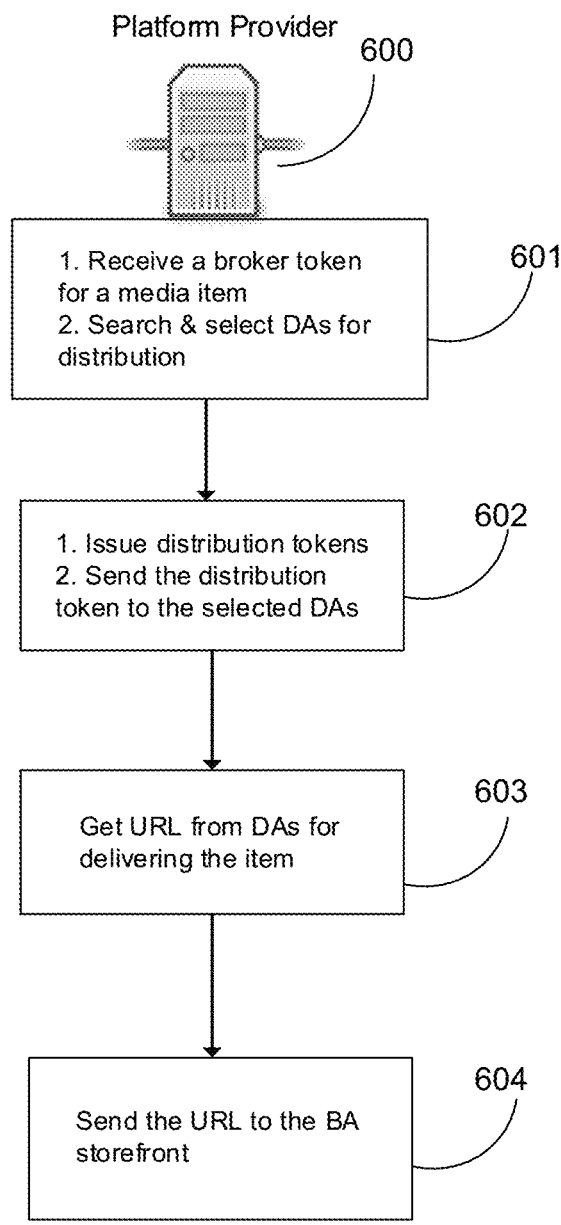
FIG. 2 is a flow diagram illustrating some steps for a platform provider to go through in an online purchase at a broker agent's storefront associated with a Hub-TV system.

FIG. 2 illustrates the steps, in an exemplary embodiment, that the PP 600 of a Hub-TV system may take to complete a media-item purchase. In step 601, the PP 600 receives a broker token for a media item from a storefront, selects the best DAs for delivery of the media item. In step 602, the PP 600 issues distribution tokens and sends the tokens to the selected DAs. In step 603, the PP 600 receives a URL from the DAs for delivery of the media item. In step 604, the PP 600 forwards the URL to the BA storefront that sent the original broker token.

Figure 3:
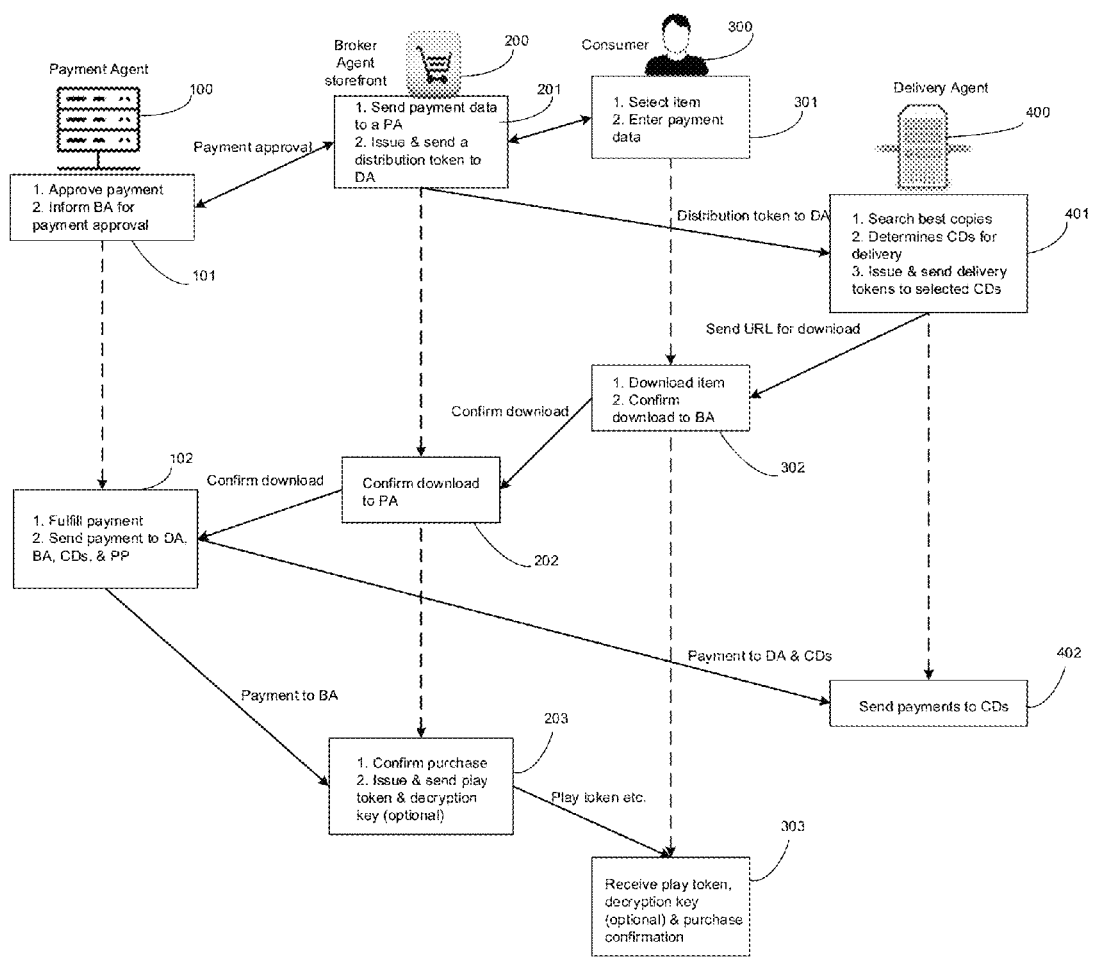
FIG. 3 is a flow diagram illustrating some steps for a consumer, a web storefront, a payment agent, and a delivery agent, to complete in a media purchase through a Hub-TV system.

FIG. 3 illustrates, in an exemplary embodiment, a flow diagram of steps for a consumer 300 to complete a purchase at the storefront 200, via the payment agent 100 and the delivery agent 400. The consumer 300 selects a media item at the storefront 200 and enters the payment data at step 301. At step 201, the storefront 200 forwards the payment data to the payment agent 100. The payment agent 100 approves the payment and informs the broker agent 200. The broker agent 200 then issues a distribution token for the selected item to the delivery agent 400 at the second half of the step 201.

Upon receiving the distribution token, the delivery agent 400 searches for the best available copies for the selected item, determines the CDs for delivering the item, issues and sends delivery tokens to the selected CDs for delivery at step 401.

Having completed step 401, the delivery agent 400 generates and sends a URL to the storefront 200 for the consumer 300 to download the copy selected by the delivery agent 400 within the infrastructure of the Hub-TV system. At step 302, the consumer 300 downloads the selected media item using the URL provided by the storefront 200 via the delivery agent 400. Having completed the download, the consumer 300 confirms the download to the storefront 200 at step 302. The storefront 200 then informs the payment agent 100 that the download has been completed at step 202.

Upon receiving the confirmation that the download has been completed, the payment agent 100 fulfills the payment and distributes the compensations to various parties at step 102. The payment agent 100 sends the compensation to the broker-agent and informs the storefront 200 that the purchase has been confirmed. Having received a confirmation of the purchase, the storefront 200 generates a play token, and optionally a decryption key, to allow the consumer 300 to play the downloaded item. At step 203, the storefront 200 sends the generated play token and the optional decryption key to the consumer 300.

Also in step 102, the payment agent 100 also sends the compensation for the delivery agent 400 and the contributing CDs involved in the delivery of the selected item directly, or indirectly through the storefront 200 or the PP, to the delivery agent 400. At step 402, the delivery agent sends the compensations to the CDs that have contributed to delivering the selected item.

At step 303, the consumer 300 receives the play token and optionally a decryption key to play the media item. The consumer 300 also receives a confirmed-purchase message from the storefront 200.

What is claimed is:

1. A machine-implemented control and management method for selling digital media items over the Internet, through a distributed infrastructure referred to as the Hub-TV system, comprising:
   a platform provider, being called the PP;
   a plurality of distributors, each being called a CD and providing a copy of a digital media item for delivery to a consumer;
   a plurality of broker agents, each being called a BA and providing a web storefront for selling digital media;
   a plurality of delivery agents, each being called a DA and providing a mechanism to search for CDs to deliver digital media items sold through the Hub-TV system;
   wherein the PP maintains interoperability of the infrastructure pieces operated by the CDs, the BAs, and the DAs;
   wherein the PP acts as an operator providing a set of services to the CDs, the BAs, and the DAs, the services including storing, searching, authentication, and delivery of all media items sold through the Hub-TV system; the CDs, the BAs, and the DAs maintain individual accounts with the PP;
   wherein the PP controls over generation, modification, and destruction of a plurality of distribution tokens in the Hub-TV system, whereby each distribution token allows a DA to choose a CD to deliver a copy of a certain digital media item;
   wherein the PP controls over generation, modification, and destruction of a plurality of delivery tokens in the Hub-TV system, whereby each delivery token allows a CD to deliver a copy of a certain digital media item to a consumer through a DA.

2. The method of claim 1, wherein a DA, upon receiving a distribution token for a certain digital media item, is allowed to issue and send a delivery token for the same media time to at least one CD.

3. The method of claim 1, wherein a consumer is enabled to consume a digital media item bought from the Hub-TV system by receiving a registration key, or an electronic receipt.

4. The method of claim 1, wherein a BA issues a broker token for a media item sold through the Hub-TV system, thereby the broker token allows the PP to generate distribution tokens for the same digital media item.

5. A machine-implemented delivery method for selling digital media items over the Internet, through a distributed infrastructure referred to as the Hub-TV system, comprising:
   a platform provider, being called the PP;
   a plurality of distributors, each being called a CD and providing a copy of a digital media item for delivery to a consumer;
   a plurality of delivery agents, each being called a DA and providing a mechanism to search for CDs to deliver digital media items sold through the Hub-TV system;
   wherein the PP acts as an operator providing a set of services to the CDs and the DAs, the services including storing, searching, authentication, and delivery of all media items sold through the Hub-TV system; the CDs and the DAs maintain individual accounts with the PP;
   wherein each CD is also a consumer who has previously purchased an authenticated copy of a media item for consumption and is allowed to resell the same media item in the Hub-TV system; the CD pays for an infrastructure comprising storage resources, server resources, and bandwidth resources, the infrastructure being called the Hub of the CD; the CD shares its Hub with the Hub-TV system allowing the Hub-TV system to store, search, retrieve, authenticate, deliver, or sell digital media items to a consumer;
   wherein, after a CD is chosen to deliver a copy of a certain digital media item, the CD sets up a mechanism for a consumer to download the same media item.

6. A machine-implemented search method for selling digital media items over the Internet, through a distributed infrastructure referred to as the Hub-TV system, comprising:
   a platform provider, being called the PP;
   a plurality of distributors, each being called a CD and providing a copy of a digital media item for delivery to a consumer;
   a plurality of delivery agents, each being called a DA and providing a mechanism to search for CDs to deliver digital media items sold through the Hub-TV system;
   wherein the PP maintains interoperability of the infrastructure pieces operated by the CDs, and the DAs;
   wherein the PP acts as an operator providing a set of services to the CDs, and the DAs, the services including storing, searching, authentication, and delivery of all media items sold through the Hub-TV system; the CDs and the DAs maintain individual accounts with the PP;

wherein the search mechanism of each DA searches for CDs with authenticated copies of a certain digital media item, which are available for delivering the media item.

* * * * *